US005093673A

United States Patent [19]

Sakai et al.

[11] Patent Number: 5,093,673

[45] Date of Patent: Mar. 3, 1992

[54] THERMAL LINE PRINTER WITH EXTERNAL MEMORY MEANS

[75] Inventors: Keita Sakai; Kazumine Koshi, both of Neyagawa, Japan

[73] Assignee: Matsushita Electric Industrial Co., Ltd., Osaka, Japan

[21] Appl. No.: 503,683

[22] Filed: Apr. 2, 1990

[30] Foreign Application Priority Data

Apr. 5, 1989 [JP] Japan .................................. 1-86279

Apr. 5, 1989 [JP] Japan .................................. 1-86280

[51] Int. Cl.[5] ............................................. G01D 15/10

[52] U.S. Cl. ............................................. 346/76 PH

[58] Field of Search .................................. 346/76 PH

[56] References Cited

U.S. PATENT DOCUMENTS

| | | | |
|---|---|---|---|
| 4,284,876 | 8/1981 | Ishibashi et al. | 219/216 |
| 4,574,293 | 3/1986 | Inui et al. | 346/76 PH |
| 4,893,191 | 1/1990 | Tanaka et al. | 346/76 PH |
| 4,912,485 | 3/1990 | Minowa | 346/76 PH |
| 4,928,117 | 5/1990 | Takeuchi | 346/76 PH |
| 4,951,152 | 8/1990 | Suzuki et al. | 346/76 PH |

FOREIGN PATENT DOCUMENTS

| | | |
|---|---|---|
| 0036965 | 10/1981 | Japan . |
| 58-11988 | 1/1983 | Japan . |
| 0068702 | 1/1983 | Japan . |
| 61-11266 | 3/1986 | Japan . |
| 61-17136 | 7/1986 | Japan . |
| 61-295056 | 12/1986 | Japan . |

*Primary Examiner*—Benjamin R. Fuller

*Assistant Examiner*—Nancy Le

*Attorney, Agent, or Firm*—Ratner & Prestia

[57] ABSTRACT

A thermal line printer is provided in which required printing is carried out by developing a thermal recording paper under heat generated by heat generating elements or by melting a heat-meltable ink under such heat to deposit melted ink on a recording paper sheet. The thermal line printer includes external memory means having a function to store print data for two or more dot lines as corrective print data and capable of asynchronously performing its write and read functions. Furthermore, both print data processing and control of the external memory means are carried out mainly by a hardware arrangement, whereby the thermal line printer is inexpensive, provides high print quality, and has high-speed printing capability.

4 Claims, 10 Drawing Sheets

THERMAL LINE PRINTER WITH EXTERNAL MEMORY MEANS

BACKGROUND OF THE INVENTION

1. Field of the invention

This invention relates to a thermal line printer in which adequate energy can be applied to a thermal head and in which transfer of print data to the thermal head can be effected at high speed.

2. Description of the prior art

Recently, thermal line printers have always been required to have high-speed and high-quality printing capabilities. Conventional thermal line printers will be described below.

As a process for control of energy to be applied to a line-type thermal head, a method is well known in which a circuit shown in FIG. 1A is utilized to control the energy to be applied to the thermal head by the use of a thermal time constant of heat generating elements of the thermal head. The operation of the circuit shown in FIG. 1A will be explained with reference to the timing chart of FIG. 1B. First, a head development signal (IN) is integrated by means of an RC circuit as indicated by the wave form P2 of FIG. 1B. The integrated wave form and the reference voltage $V_{ref}$ are compared with each other by means of a comparator 101. As can be seen from FIG. 1B, while the voltage of the signal P2 is greater than a predetermined voltage, the head development signal IN is suppressed at an AND gate 102 by the output from an inverter 103, resulting in a short period of "high level" for the output signal OUT which corresponds to the head development signal IN. Another process is such that corrective print data is transferred to the thermal head according to calculations within a microcomputer or such that a large number of shift registers are used to form a corrective print data generating circuit.

However, with the above-mentioned conventional arrangements, and particularly with the technique for controlling heat accumulation in the thermal head by utilizing the arrangement shown in FIG. 1, although application of pulses to the thermal head for one dot line at a time may eliminate the effect of heat accumulation when viewed in dot line terms, individual heat generating elements are not free from the effect of heat accumulation. Therefore, dots differing in size are printed with the result of considerable deterioration of print quality.

The arrangement for corrective print data transfer according to calculations within the microcomputer is disadvantageous in that since corrective print data is calculated on a soft basis, a considerably long time is required for data processing, which retards high speed printing. The arrangement utilizing a large number of shift registers is disadvantageous in that it involves a very high cost in providing of a control circuit and in that it requires a large space for installing shift registers. Furthermore, it requires considerable expenditure for gate arrays.

SUMMARY OF THE INVENTION

A thermal line printer of this invention, which overcomes the above-discussed and numerous other disadvantages and deficiencies of the prior art, comprises a parallel-serial converter for converting parallel print data outputted from a host computer or microcomputer into serial print data; an external memory means having a function to store as corrective print data any print data for two or more dot lines from said parallel-serial converter and capable of asynchronously performing its write and read functions; a control circuit for controlling the operation of said memory means and of said parallel-serial converter; a selector circuit for corrective print data which makes selection of various serial print data from both said parallel-serial converter and said memory means and which transfers selected serial print data to a thermal head; a first counter means which counts the amount of the serial print data converted by said parallel-serial converter and which halts the output of control signals from said control circuit when a predetermined amount of print data has been counted; and a second counter means which counts the amount of the corrective print data to be transferred to said thermal head and which halts the output of control signals from said control circuit when a predetermined amount of corrective print data has been counted.

In a preferred embodiment, the external memory means is a memory containing a third counter means in which write and read addresses are externally initialized, said addresses being serially counted by an external clock.

Another thermal line printer of this invention, comprises a parallel-serial converter for converting parallel print data outputted from a host computer or microcomputer into serial print data; an external memory means having a function to store as corrective print data any print data for two or more dot lines from said parallel-serial converter and capable of asynchronously performing its write and read functions; a control circuit for controlling the read and write timing of said memory means; a selector circuit for corrective print data which makes selection of various serial print data from both said parallel-serial converter and said memory means and which transfers selected serial print data to a thermal head; a first counter means for counting the amount of the print data converted by said parallel-serial converter; a first external clock halting circuit which halts the operation of said parallel-serial converter and the writing of said memory means in response to an output from said first counter means; a second counter means for counting the amount of corrective print data to be transferred to said thermal head; and a second external clock halting circuit which halts the transfer of print data to the thermal head in response to an output from said second counter means.

In a preferred embodiment, the external memory means is a memory containing a third counter means in which write and read addresses are externally initialized, said addresses being serially counted by an external clock.

Thus, the invention described herein makes possible the objectives of (1) providing a thermal line printer in which storage of print data necessary for heat accumulation control of the thermal head is effected by only one low-capacity external memory, and in which in order to enhance the efficiency of control of the microcomputer, both print data processing and control of the external memory are carried out mainly by means of hardware; and (2) providing a thermal line printer which is inexpensive to manufacture and which has high-quality and high-speed printing capabilities.

BRIEF DESCRIPTION OF THE DRAWINGS

This invention may be better understood and its numerous objects and advantages will become apparent to those skilled in the art by reference to the accompanying drawings as follows.

DETAILED DESCRIPTION OF THE INVENTION

In the thermal line printer of the invention, parallel-serial conversion is carried out by means of hardware on a word-by-word basis, and the print data within the memory means is rewritten while print data is transferred to the thermal head. Another operation such that the print data within the memory means is transferred as corrective print data to the thermal head is also carried out by means of hardware. Moreover, data transfer to the thermal head is carried out on the hardware for each word or each dot line. By applying corrective print data to the thermal head in this way, it is possible to vary the magnitude of energy to be applied to each individual heat generating element according to previous color development combinations and thus to effect adequate energy application to individual heat generating elements of the thermal head. Furthermore, it is possible to substantially increase the rate of corrective print data transfer to the thermal head.

DESCRIPTION OF THE PREFERRED EMBODIMENTS

Example 1

Figure 1A:
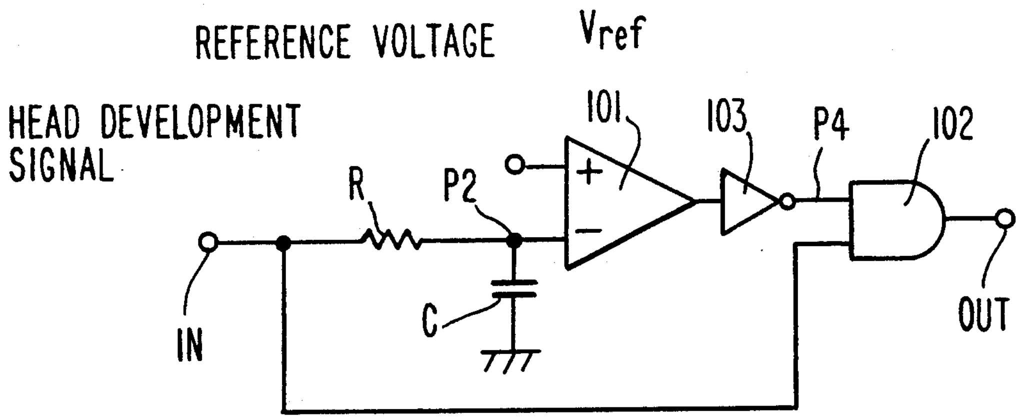
PRIOR ART Fig. 1A
FIGS. 1A and 1B are, respectively, a schematic circuit diagram and a voltage waveform diagram for an input integration circuit, both for explanation of the heat accumulation control system employed in a conventional thermal head where the heat time constant of heat generating elements and charging and discharging of capacitors are utilized.
Figure 1B:
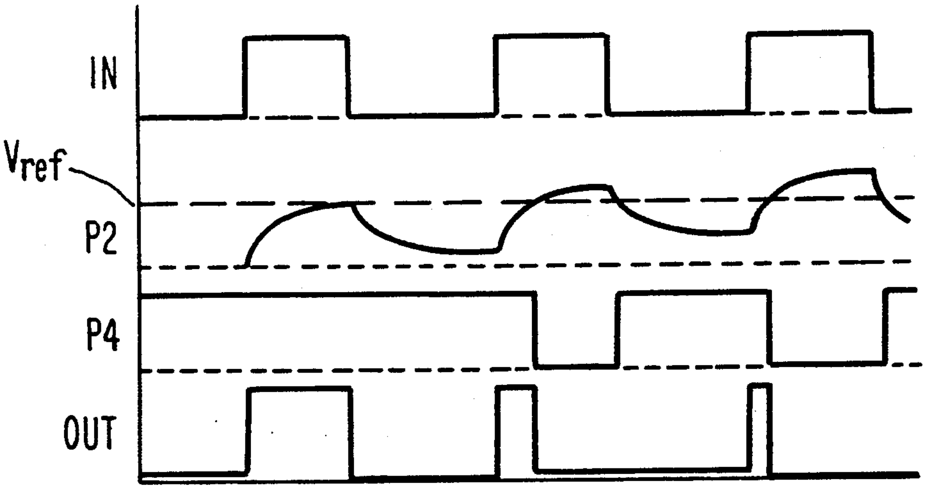
PRIOR ART Fig. 1B
Figure 2A:
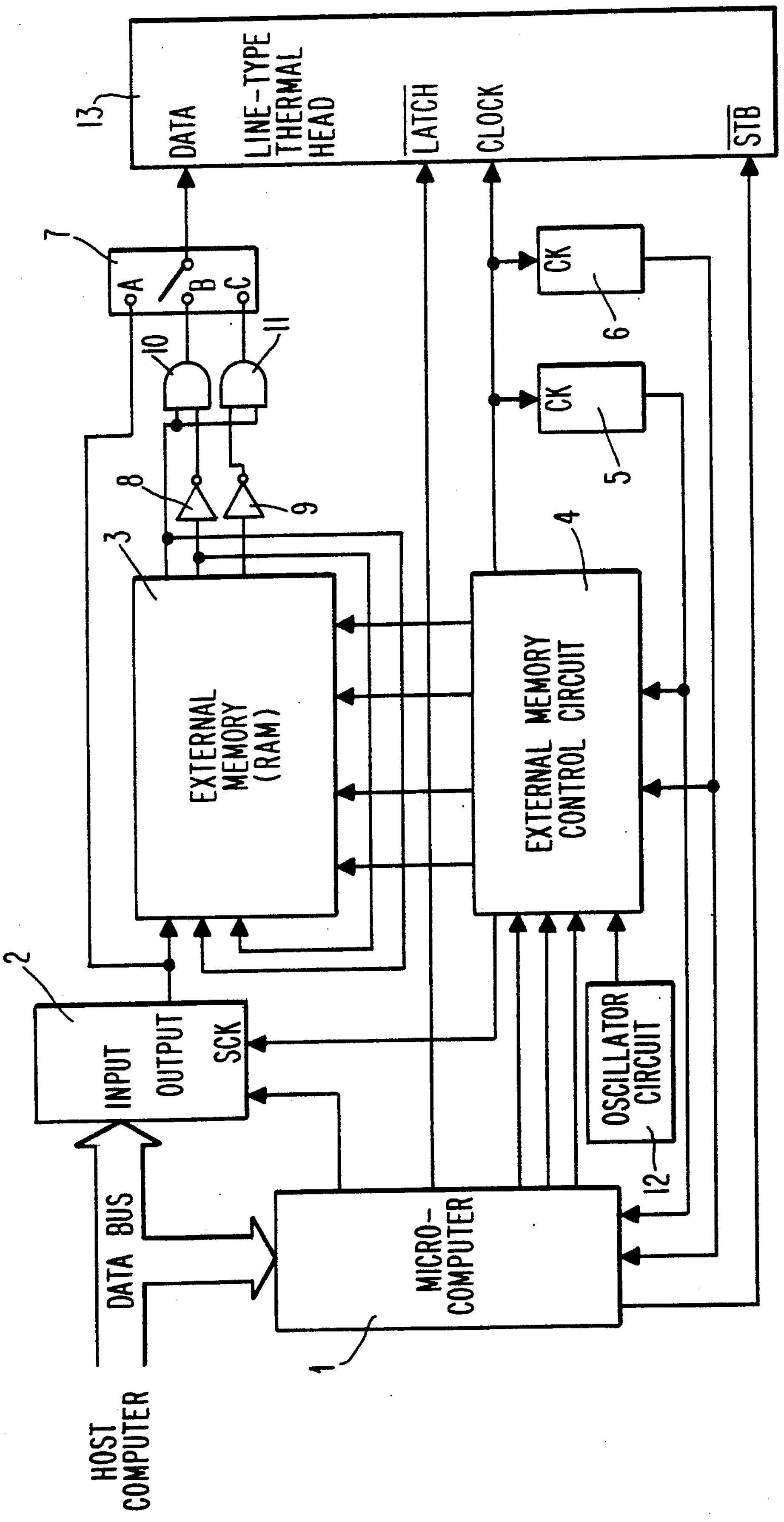
FIGS. 2*a*, 5, 6, and 7 are schematic diagrams showing respective control circuits for various forms of thermal line printers of this invention.
Figure 2B:
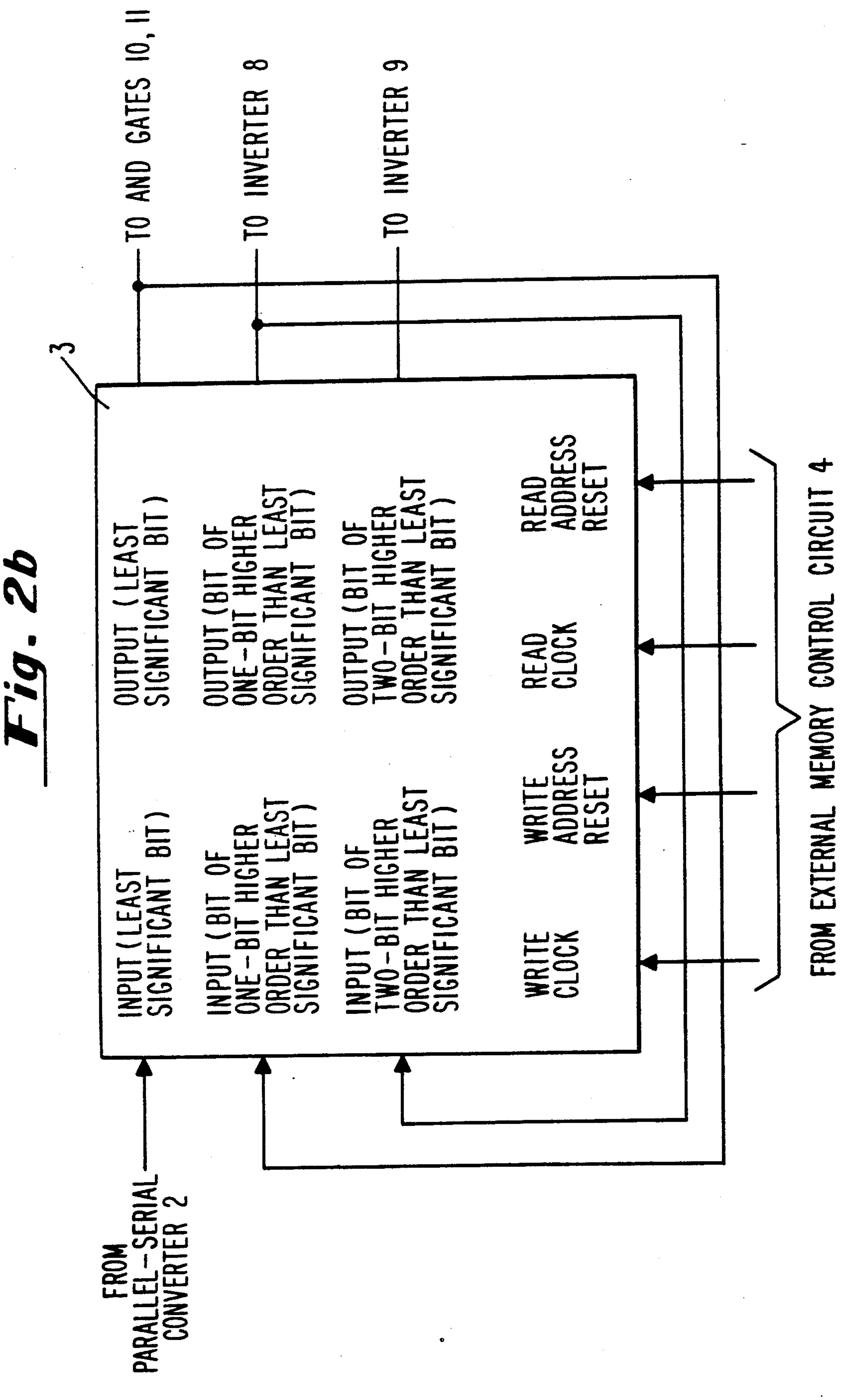
FIG. 2*b* shows the external memory 3 shown in FIG. 2*a* in more detail.

FIG. 2*a* is a schematic diagram showing a control circuit for the thermal line printer of this invention. In FIG. 2*a*, reference numeral 1 designates a microcomputer; 2 designates a parallel-serial converter which converts current print data (parallel data) outputted from a host computer or the microcomputer 1 into serial data; 3 designates an external memory (RAM) which stores therein current print data supplied from the host computer or microcomputer 1 through the parallel-serial converter 2 or which outputs current and past print data stored therein; 4 designates an external memory control circuit which initializes write and read addresses in the external memory 3 and which controls both the clocks for write address and read address in the external memory 3, and the clocks for parallel-serial conversion; and 5, 6 designate counters which monitor the amount of print data outputted from the external memory 3 or parallel-serial converter 2, the counter 5 being an 8-bit monitor counter for monitoring the amount of serial data outputted from the parallel-serial converter 2, the counter 6 being a one-dot-line monitor counter for monitoring the amount of corrective print data transferred to a thermal head 13. The external memory 3 is shown in FIG. 2*b* in more detail.

Reference numeral 7 designates a corrective print data selector circuit which makes selection of corrective print data outputted from the parallel-serial converter 2 and AND gates 10, 11, and which transfers the selected corrective print data to the thermal head 13; 8, 9 designate inverters; 12 designates an oscillator circuit for generating external clocks; and 13 designates a line-type thermal head.

Referring now to the external memory 3 in particular, write and read addresses are initialized by an external control signal and the addresses are sequentially counted by an external clock. For this purpose, the external memory 3 incorporates independent read/write address generating counters which enable the memory to perform write and read operations asynchronously. Needless to say, however, the address generating counters may not necessarily be incorporated in the external memory. The address generating counters may be provided outside the external memory.

The control circuit of the above-described construction for the thermal line printer will be explained with reference to FIGS. 2–4.

The explanation herein relates to the method of controlling the thermal head by using print data for the immediately previous two dot lines.

Figure 3:
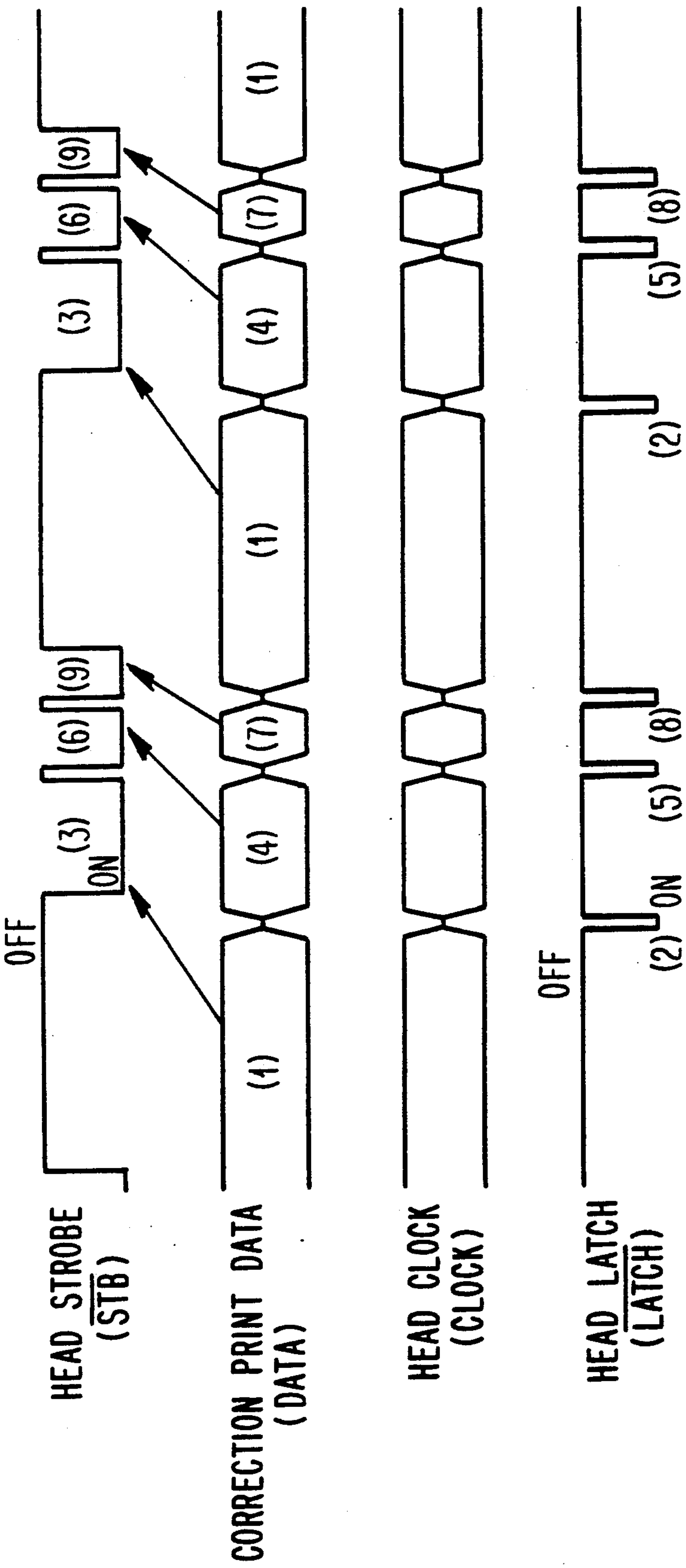
FIG. 3 is a timing chart for the data transfer operation taken as a whole.

Referring first to FIG. 3, current print data from the host computer or microcomputer 1 is transferred as corrective print data (1) to the thermal head 13 and, upon completion of the transfer for one dot line, a latch pulse (2) from the microcomputer 1 allows the thermal head 13 to hold the corrective print data. According to the data so held, the thermal head 13 operates for development with respect to dots corresponding to the data "1", and does not operate for development with respect to dots corresponding to the data "0", while a head strobe (3) is ON.

After the latch pulse (2) is supplied, corrective print data (4) as the logical AND between the current print data and the inverted data of one-dot-line earlier print data is transferred to the thermal head 13 for one dot line; and upon the head strobe (3) being changed from ON state to OFF state, a latch pulse (5) simultaneously outputted allows the thermal head 13 to hold the corrective print data. According to the data so held, the thermal head 13 operates for development with respect to dots corresponding to the data "1", and does not operate for development with respect to dots corresponding to the data "0", while a head strobe (6) is ON.

Again, after the latch pulse (5) is supplied, corrective print data (7) as the logical AND between the current print data and the inverted data of two-dot-line earlier print data is transferred to the thermal head 13; and upon the head strobe (6) being changed from ON state to OFF state, a latch pulse (8) simultaneously outputted allows the thermal head 13 to hold the corrective print data. According to the data so held, the thermal head 13 operates for development with respect to dots corresponding to the data "1", and does not operate for development with respect to dots corresponding to the data "0", while a head strobe (9) is ON.

Then, the host computer or microcomputer 1 returns to the first stage of current print data transfer for repetition of the above-mentioned series of operations.

The foregoing operation will hereinafter be described in further detail.

In FIG. 3, during the transfer of the current corrective print data (1), the current print data from the microcomputer 1 shown in FIG. 2a or host computer is first transferred to the parallel-serial converter 2 in which the data is retained. In the parallel-serial converter 2, the parallel data is converted into serial data synchronously with parallel-serial conversion external clock pulses outputted from the external memory control circuit 4, and the new current print data resulting from the parallel-serial conversion is written to the external memory 3 at the least significant bit (a space for storage of the current print data) beginning from zero address, while the new current print data is transferred as corrective print data to the thermal head 13 via the corrective print data selector circuit 7. The address for such writing in the external memory 3 varies synchronously with write-purpose external clock pulses fed from the external memory control circuit 4.

In this case, the external memory 3 is capable of asynchronously performing writing and reading, the old print data written at the least significant bit in the external memory 3 prior to the writing of the new current print data is previously read from the addresses beginning with the zero address one bit at a time and is written as one-dot-line earlier print data in each bit of one-bit higher order (a space for storage of one-dot-line earlier print data) than the least significant bit within the external memory 3 simultaneously with the new current print data being written. Thereupon, the one-dot-line earlier print data which was written in the bit of one-bit higher order than the least significant bit within the external memory 3 prior to the above-mentioned writing operation is first read one bit at a time and is then written as two-dot-line earlier print data in each bit of two-bit higher order (a space for storage of two-dot-line earlier print data) than the least significant bit within the external memory 3.

Upon completion of the above-described operation for one byte, the 8-bit monitor counter 5, which operates according to clock pulses fed from the external memory control circuit 4, counts up to halt all external clock pulsing from the external memory control circuit 4. A next unit of print data is transferred to the parallel-serial converter 2, the above-described operation being thus repeated. When corrective print data for one dot line has been transferred to the thermal head 13, the one-dot-line monitor counter 6, which operates according to clock pulses fed from the external memory control circuit 4, counts up to halt all external clock pulsing from the external memory control circuit 4. At that time, a latch signal is transferred from the microcomputer 1 to the thermal head 13 which thereby holds the corrective print data. The corrective print data so held is used for the control of development operation of the thermal head 13 while the head strobe (3) shown in FIG. 3 is ON. During the transfer of the current corrective print data (1), the corrective print data selector circuit 7 selects A to transfer the corrective print data to the thermal head 13. The corrective print data selector circuit 7 is controlled by the microcomputer 1.

Then, corrective print data (4) based on both the current print data and the one-dot-line earlier print data are transferred while the head strobe (3) is ON. The corrective print data so transferred is used to control the development operation of the heat generating elements of the thermal head 13 while the next head strobe (6) is ON. For this purpose, three kinds of print data stored in the external memory 3 as shown in FIG. 2a are read beginning from the corresponding zero address synchronously with read-purpose external clock pulses outputted from the external memory control circuit 4. One-dot-line earlier print data thus read from the external memory 3 is inverted in the inverter 8, and a logical AND between the inverted data and the current print data read from the external memory 3 as carried out at the AND gate 10 is transferred as corrective print data to the thermal head 13. Upon transfer of the corrective print data for one dot line, the counter 6 counts up to halt all external clock pulsing from the external memory control circuit 4. When the head strobe (3) is changed from the ON state to the OFF state by the microcomputer 1, a latch pulse (5) is transmitted to the thermal head 13 which thereby holds the corrective print data. The corrective print data so held is used for the control of development operation of the thermal head 13 while the head strobe (6) shown in FIG. 3 is ON. During the transfer of the current corrective print data (4), the corrective print data selector circuit 7 selects B. In this case, the external memory 3 carries out reading only and not writing.

Then, corrective print data (7) based on both the current print data and the two-dot-line earlier print data are transferred while the head strobe (6) is ON. This data transfer allows the thermal head 13 to perform the development operation while the next head strobe (9) is ON.

In this case, operation is carried out in the same way as in the transfer of the previous corrective print data (4), except that the corrective print data selector circuit 7 selects C.

Figure 4:
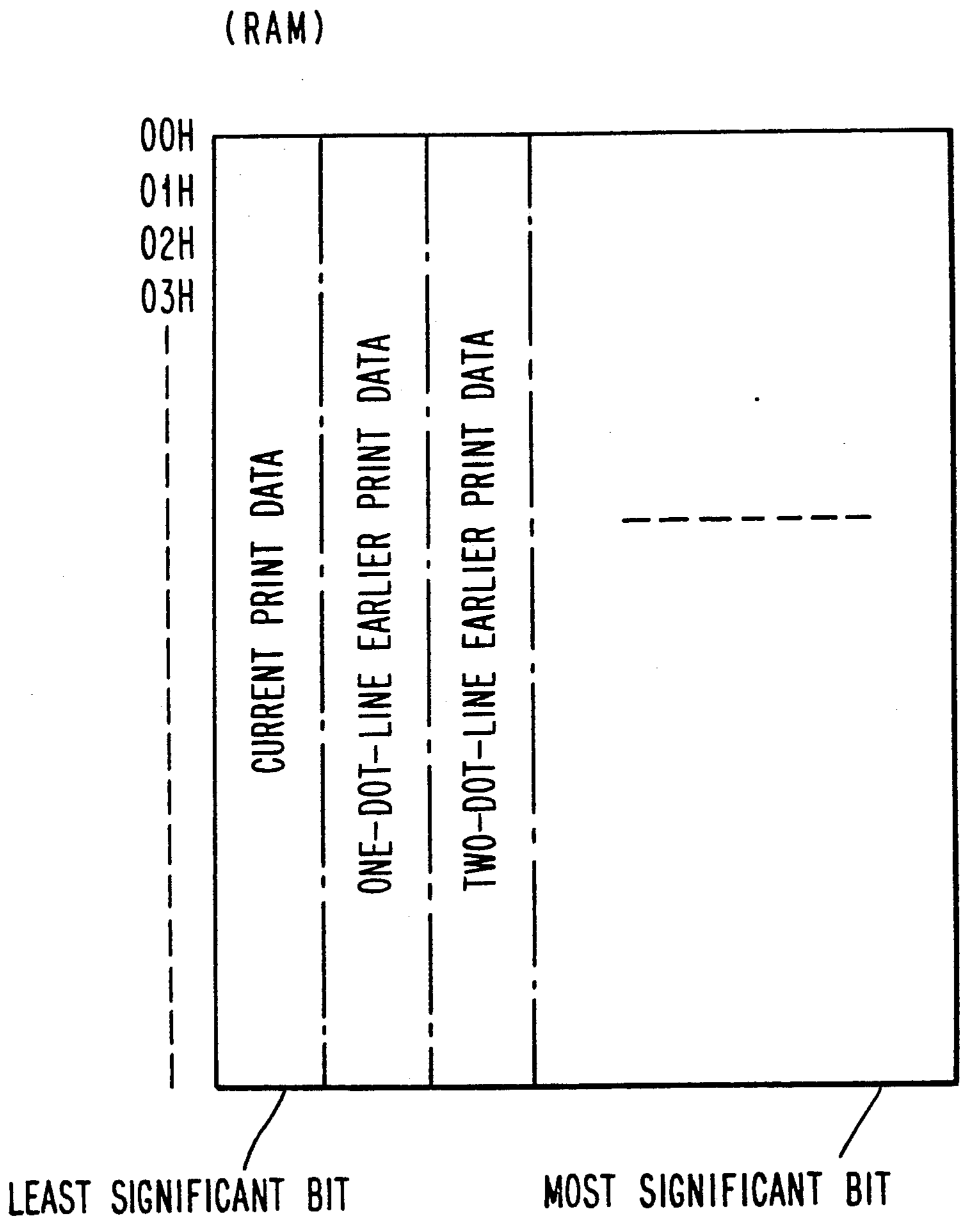
FIG. 4 is a memory map of an external memory.

Through such series of operations, as shown in FIG. 4, the current print data for one dot line is always serially stored in the least significant bit within the external memory 3 (RAM); one-dot-line earlier print data is serially stored in each bit of one-bit higher order than the least significant bit within the external memory 3; two-dot-line earlier print data is serially stored in each bit of two-bit higher order than the least significant bit within the external memory 3.

Example 2

Figure 5:
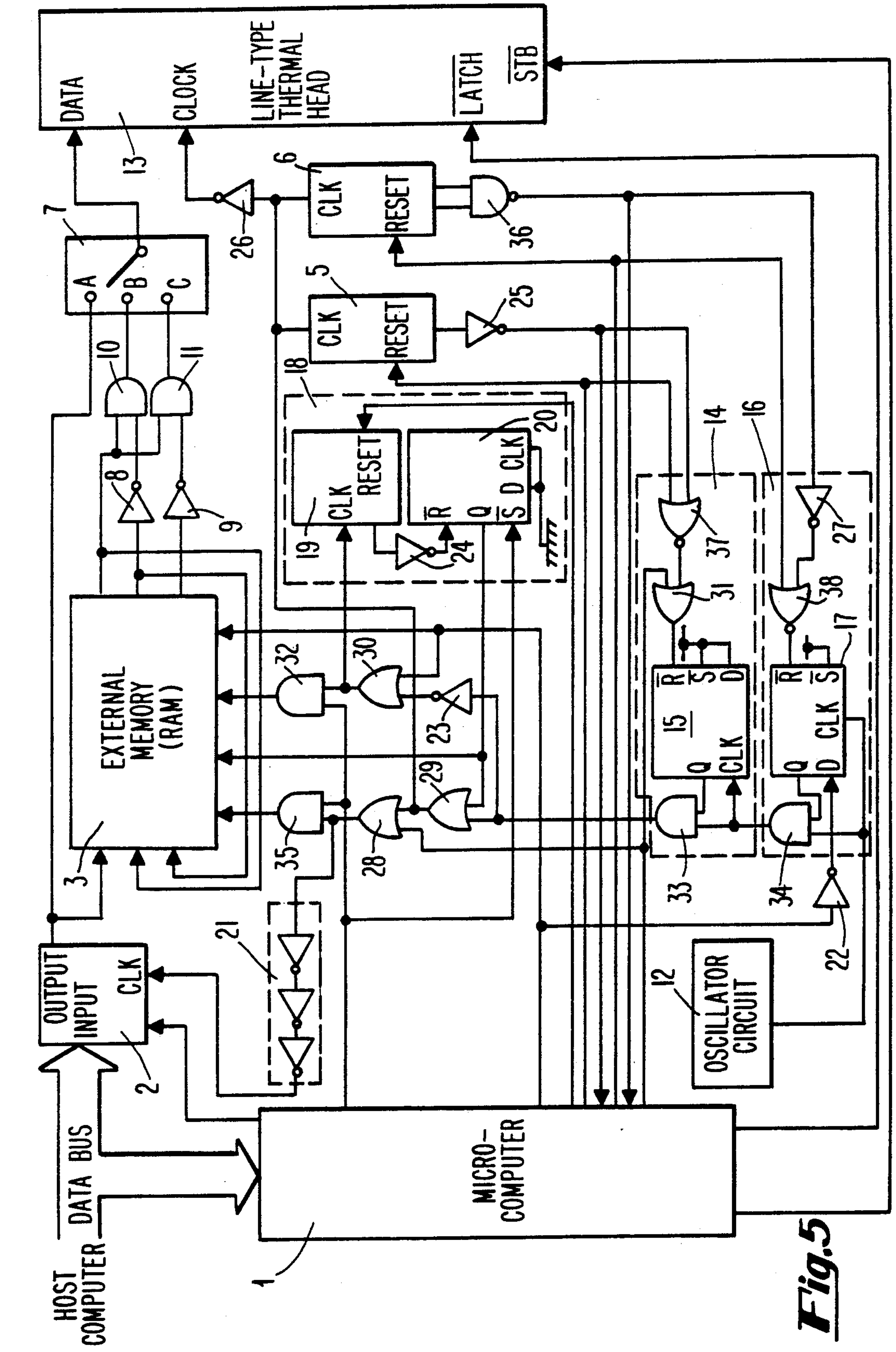

FIG. 5 is a schematic diagram showing another control circuit for the thermal line printer of this invention, in which the same parts as those shown in FIG. 2a are designated by the same reference numerals. In FIG. 5, reference numeral 1 designates a microcomputer; 2 designates a parallel-serial converter which converts current print data (parallel data) outputted from the host computer or microcomputer 1 into serial data; 3 designates an external memory (RAM) which stores therein the current print data outputted from the host computer or microcomputer 1 and which outputs current and past print data stored therein; 5 designates an 8-bit monitor counter which monitors the number of serial data units converted from parallel data in the parallel-serial converter 2; 6 designates a one-dot-line monitor counter which monitors the number of corrective print data units transferred to the thermal head 13; 7 designates a corrective print data selector circuit which selects various corrective print data and which transfers the selected corrective print data to the thermal head 13; 14 designates a first external clock halting circuit which halts both parallel-serial conversion and counting of addresses in the external memory 3 when the counter 5 counts up and which causes both parallel-serial conversion and counting of addresses in the external memory 3 to be restarted upon resetting of the counter 5 by the microcomputer 1; 15 designates a D flip-flop circuit within the first external clock halting circuit 14; 16 designates a second external clock halting circuit which halts the transfer of corrective print data to the thermal head 13 when the counter 6 counts up and which causes the transfer of corrective print data to the thermal head 13 to be restarted upon resetting of the counter 6 by the microcomputer 1; 17 designates a D flip-flop circuit within the second external clock halting circuit 16; 18 designates a read/write timing control circuit which delays an initial write address signal behind an initial read address signal as required in order to enable writing to the external memory 3 of print data read from the external memory 3; 19 designates a delay monitor counter within the read/write timing control circuit 18; 20 designates a D flip-flop circuit; 21 designates a delay circuit; 22 to 7 designate inverters; 28 to 31 designate OR gates; 32 to 35 designate AND gates; 36 designates a NAND gate; and 37, 38 designate NOR gates.

The process of controlling the thermal head in the control circuit of the foregoing construction for the thermal line printer is substantially the same as that described in Example 1.

The operation of the control circuit will be explained in detail. In FIG. 5, during the transfer of the current print data (1) as shown in FIG. 3, the current print data (for the first byte) from the microcomputer 1 or host computer is transferred to the parallel-serial converter 2 in which the data is held. An initial address (zero address) is set for reading from the external memory 3. A read clock counts addresses to read print data from the external memory 3 beginning from zero address therein. The counting of the read clock is monitored by the delay monitor counter 19 in the read/write timing control circuit 18, and when a two-clock delay is counted, the D flip-flop circuit 20 is reset so that by an output therefrom is set an initial write address value (zero address) in the external memory 3. Thus, the parallel data held in the parallel-serial converter 2 is converted into serial data synchronously with external clocking for parallel-serial conversion. The current print data thus converted from parallel into serial is then transferred to the corrective print data selector circuit 7, whereupon addresses are counted by a write clock so that past print data outputted from the external memory 3 two clocks earlier and the current print data converted from parallel into serial are written concurrently to the external memory 3. It is noted, however, that the above-mentioned two clocks vary in number according to the external memory employed.

Upon completion of the above operation for one byte, the 8-bit monitor counter 5 counts up to reset the D flip-flop circuit 15 of the first external clock halting circuit 14, whereby external clocking from the external clock generating oscillator circuit 12 is halted and, in turn, both parallel-serial conversion and writing to the external memory 3 by address counting are halted. Next print data (for the second byte) is transferred to the parallel-serial converter 2 for being held therein and the counter 5 is reset, whereupon the above-mentioned series of operations is automatically repeated. It is noted, however, that initial address setting in the external memory 3 is not required to perform the operations for the second and subsequent bytes which can be carried out in succession to the read/write addresses for the first byte print data.

The above-mentioned series of operations is repeated for transfer to the thermal head 13, of corrective print data for a next dot line and, thereupon, the one-dot-line monitor counter 6 counts up to reset the D flip-flop circuit 17 in the second external clock halting circuit 16. Thus, external clocking from the external clock generating oscillator circuit 12 is halted, whereupon the transfer of current print data (1) comes to an end. It is noted, however, that in this case the corrective print data selector circuit 7 selects A for transfer of the current print data as the corrective print data to the thermal head 13. The corrective print data selector circuit 7 is controlled by the microcomputer 1.

For the transfer of corrective print data (4) based on the current print data and one-dot-line earlier print data, an initial read address is first set in the external memory 3 shown in FIG. 5 and addresses are counted by read clocking to read various print data beginning from the zero read address. In this case, no print data is written to the external memory 3; and no external clock is halted when the counter 5 counts up.

Subsequently, past print data thus read are inverted in the inverters 8, 9 and a logical AND between the inverted data and the current print data at the AND gates 10, 11 is transferred as corrective print data to the thermal head 13, whereupon the one-dot-line monitor counter 6 counts up to halt external clocking from the external clock generating oscillator circuit 12, which results in completion of the transfer of corrective print data (4) based on the current print data and one-dot-line earlier print data. In this case, it is noted that the corrective print data selector circuit 7 selects B.

The transfer of corrective print data (7) based on the current data and two-dot-line earlier print data is carried out in the same way as the transfer of the previous corrective print data (4), except that the corrective print data selector circuit 7 selects C in this case.

Through such control operations, as shown in FIG. 4, current print data for one dot line is always serially stored in the least significant bit within the external memory 3; one-dot-line earlier print data is serially stored in each bit of one-bit higher order than the least significant bit within the external memory 3; and two-dot-line earlier print data is serially stored in each bit of two-bit higher order than the least significant bit within the external memory 3.

Example 3

Figure 6:
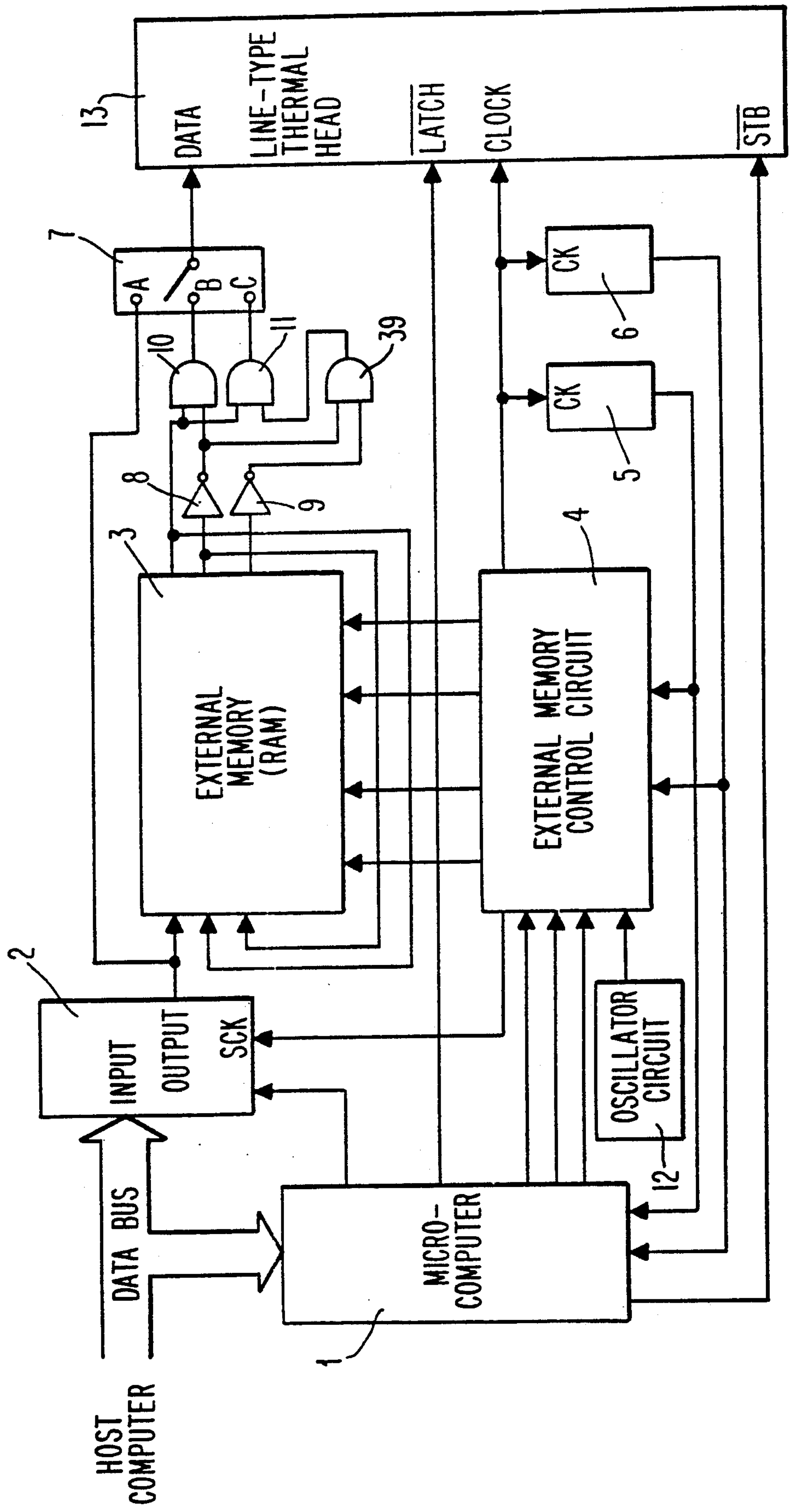

FIG. 6 is a schematic diagram showing another control circuit for the thermal line printer of this invention, in which an AND gate 39 is added between the external memory 3 and the corrective print data selector circuit 7 in the same control circuit as that described in Example 1 and shown in FIG. 2*a*. The process of controlling the thermal head in the control circuit of the above arrangement and details of control operation are similar to those described in Example 1.

Example 4

Figure 7:
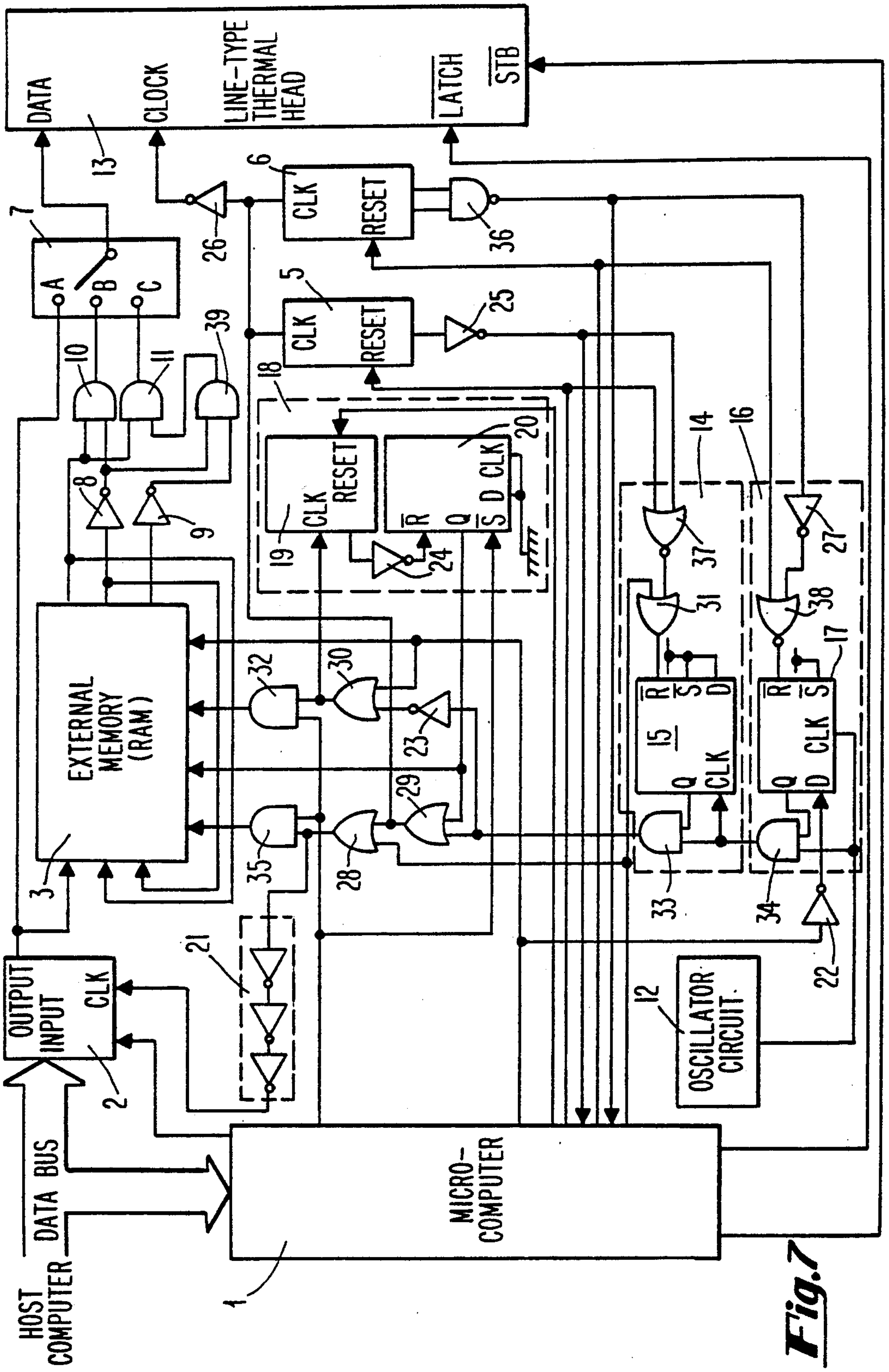

FIG. 7 is a schematic diagram showing another control circuit for the thermal line printer of this invention, in which an AND gate 39 is added between the external memory 3 and the corrective print data selector circuit 7 in the same control circuit as that described in Example 2 and shown in FIG. 5.

The process of controlling the thermal head in the control circuit of the above arrangement and details of control operation are similar to those described in Example 2.

Figure 8:
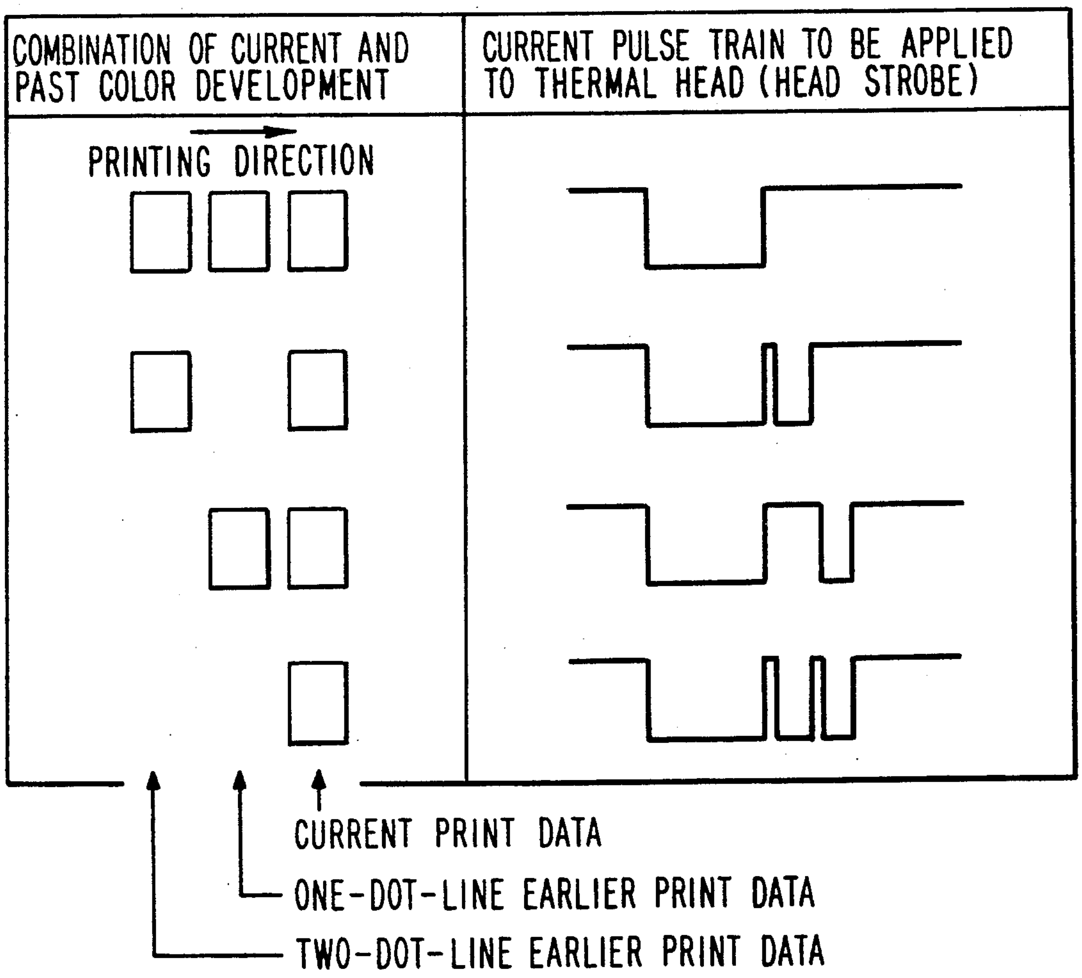
FIGS. 8 and 9 are diagrams illustrating algorithms for determination of the values of energy to be applied to the thermal head.
Figure 9:
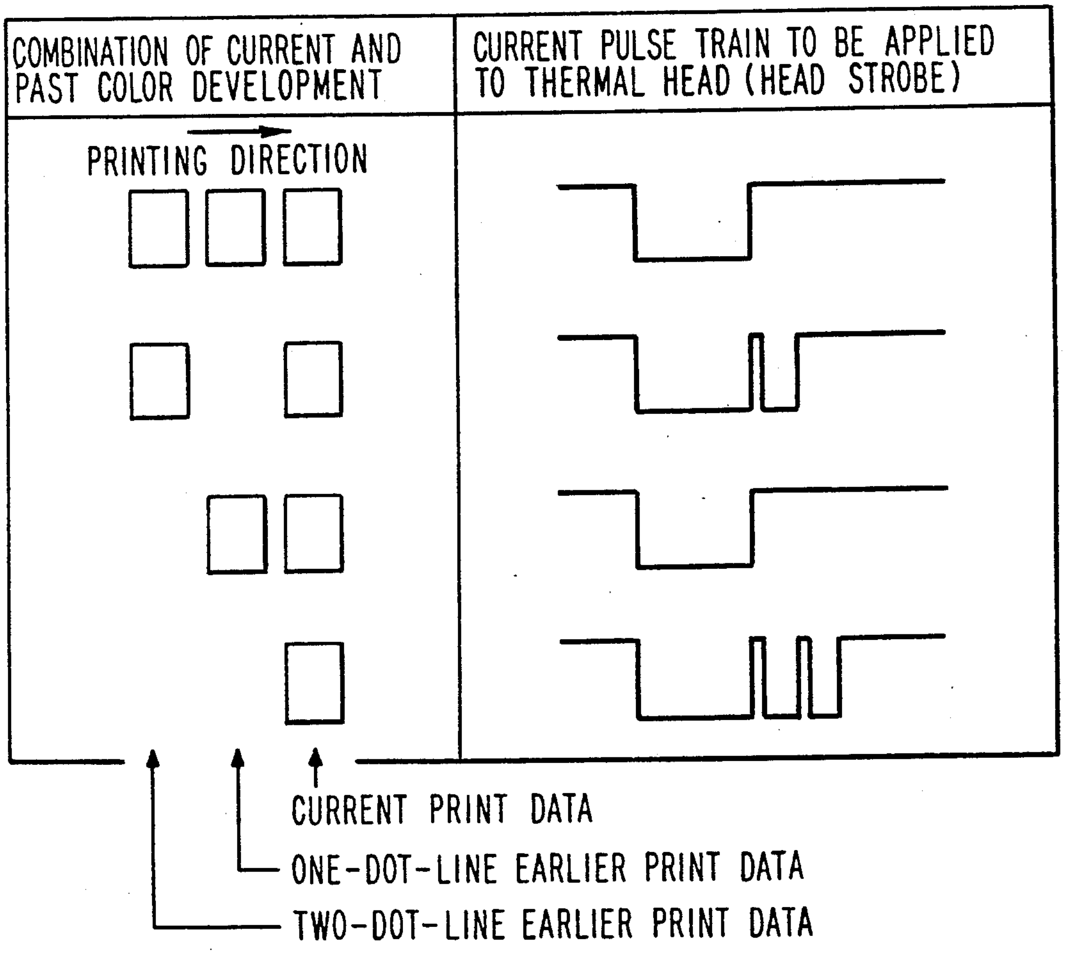

According to the arrangement of the foregoing Examples 1 and 2, as shown in FIG. 8, and according to Examples 3 and 4, as shown in FIG. 9, with individual heat generating elements taken in view, the magnitude of energy to be applied to the thermal head is adjusted according to the combination of one-dot earlier and two-dot earlier developments so that the magnitude of the energy is reduced if, for example, color development of one-dot earlier heat generating element and that of two-dot earlier heat generating element are effected in succession, while the magnitude of energy is increased if, for example, no color development is effected with respect to the earlier heat development elements. Thus, it is possible to eliminate the effect of heat accumulation with respect to individual heat generating elements.

In the above-described examples, although the process of control using print data for two earlier dot lines is shown, it is understood that control can be effected in a similar manner by using three or more earlier dot lines.

In the foregoing examples, although head strobe signals are turned on and off each time when corrective print data is transferred in the course of one dot line, such on/off control may not necessarily be made each time only if development time is kept under control. Moreover, the width of each of the head strobe signals in the current pulse train to be applied to the thermal head can be varied and preferably is decreased in the order of the corresponding print data (i.e., first current print data, then one-dot-line earlier print data, and finally two-dot-line earlier print data) as shown in FIGS. 8 and 9.

As described above, according to the invention, adequate energy can be applied to individual heat generating elements by applying various corrective print data to the print data in the thermal head. Furthermore, such corrective print data is prepared by means of a hardware arrangement and the data is transferred to the thermal head synchronously with external clock pulses outputted from external oscillation means; and therefore, data transfer can be effected at higher speed than that attained according to calculations within a microcomputer. Another advantage is that storage of current and past print data can be effected by using one external memory only. Thus, according to the invention, it is possible to provide a thermal line printer which is inexpensive to manufacture and which has high-quality and high-speed printing capabilities.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A thermal line printer comprising a parallel-serial converter for converting parallel print data outputted from a host computer or microcomputer into serial print data; an external memory means having a function to store as corrective print data any print data for two or more dot lines from said parallel-serial converter and capable of asynchronously performing said external memory means write and read functions; a control circuit for controlling said memory means and of said parallel-serial converter; a selector circuit for corrective print data which makes selection of various serial print data from both said parallel-serial converter and said memory means and which transfers selected serial print data to a thermal head; a first counter means which counts an amount of the serial print data converted by said parallel-serial converter and which halts an output of control signals from said control circuit when a predetermined amount of print data has been counted; and a second counter means which counts an amount of the corrective print data to be transferred to said thermal head and which halts the output of control signals from said control circuit when a predetermined amount of corrective print data has been counted.

2. A thermal line printer according to claim 1, wherein said external memory means is a memory containing a third counter means in which write and read addresses are externally initialized, said addresses being serially counted by an external clock.

3. A thermal line printer comprising a parallel-serial converter for converting parallel print data outputted from a host computer or microcomputer into serial print data; an external memory means having a function to store as corrective print data any print data for two or more dot lines from said parallel-serial converter and capable of asynchronously performing said external memory means write and read functions; a control circuit for controlling read and write timing of said memory means; a selector circuit for corrective print data which makes selection of various serial print data from both said parallel-serial converter and said memory means and which transfers selected serial print data to a thermal head; a first counter means for counting an amount of the print data converted by said parallel-serial converter; a first external clock halting circuit which halts said parallel-serial converter and the storing of said memory means in response to an output from said first counter means; a second counter means for counting an amount of corrective print data to be transferred to said thermal head; and a second external clock halting circuit which halts the transfer of print data to the thermal head in response to an output from said second counter means.

4. A thermal line printer according to claim 2, wherein said external memory means is a memory containing a third counter means in which write and read addresses are externally initialized, said addresses being serially counted by an external clock.

* * * * *